(12) United States Patent
Wardoyo et al.

(10) Patent No.: US 8,657,893 B2
(45) Date of Patent: Feb. 25, 2014

(54) METHOD FOR PRODUCING SINTERED CUBIC BORON NITRIDE COMPACT

(75) Inventors: Akhmadi Eko Wardoyo, Naka-gun (JP); Itsurou Tajima, Naka-gun (JP); Minoru Akaishi, Kumagaya (JP)

(73) Assignee: Mitsubishi Materials Corporation, Tokyo (JP)

( * ) Notice: Subject to any disclaimer, the term of this patent is extended or adjusted under 35 U.S.C. 154(b) by 458 days.

(21) Appl. No.: 13/022,834

(22) Filed: Feb. 8, 2011

(65) Prior Publication Data

US 2011/0192093 A1     Aug. 11, 2011

(30) Foreign Application Priority Data

Feb. 9, 2010   (JP) .................................. 2010-026539

(51) Int. Cl.
*B24D 3/06*      (2006.01)
*C04B 35/5831*   (2006.01)
*C04B 35/583*    (2006.01)

(52) U.S. Cl.
USPC ............................ 51/293; 423/290; 501/96.4

(58) Field of Classification Search
USPC ............ 51/293, 307; 501/96.1, 96.4; 423/290
See application file for complete search history.

(56) References Cited

U.S. PATENT DOCUMENTS 3,661,521 A * 5/1972 Birle .............................. 423/290

FOREIGN PATENT DOCUMENTS

| | | |
|---|---|---|
| CN | 101372038 A | 2/2009 |
| EP | 0439419 A1 | 7/1991 |
| JP | 03-159964 A | 7/1991 |
| JP | 10-024270 A | 1/1998 |
| JP | 11-090362 A | 4/1999 |
| JP | 2000-7310 A | 1/2000 |
| JP | 2006-21977 A | 1/2006 |
| JP | 2007-070148 A | 3/2007 |
| JP | 2007-314380 A | 12/2007 |
| JP | 2010-24103 A | 2/2010 |

OTHER PUBLICATIONS

European Search Report mailed Oct. 25, 2012 for the corresponding European Application No. EP 11 15 3477.
Office Action mailed Apr. 20, 2012 for the related Japanese Patent Application No. 2011-023662.
Notice of Allowance mailed Jul. 5, 2012 for the related Japanese Patent Application No. 2011-023662.
Office Action mailed Aug. 5, 2013 for the corresponding Chinese Patent Application No. 201110036037.6.

* cited by examiner

*Primary Examiner* — Pegah Parvini
(74) *Attorney, Agent, or Firm* — Leason Ellis LLP.

(57) ABSTRACT

A method for producing a highly uniform and highly dense sintered cubic boron nitride compact having high hardness by sintering at a milder condition without a binder, is provided. The method includes deflocculating secondary particles in cubic boron nitride starting powders by dispersing the starting powders in a solution of a deflocculant; molding the green compact after removing the solution of the deflocculant from the starting powders; and then sintering the green compact in the presence of a supercritical fluid source in a supercritical state by pressing and heating the green compact together with the supercritical fluid source. The supercritical fluid source can be one or more selected from a group consisted of polyvinylidene chloride, polyvinyl chloride, polyethylene, polypropylene, polystyrene, a polyester and an ABS resin. In the sintering, the pressure is 5 GPa or higher, and the temperature is 1400° C. or higher. According to the method, a highly uniform and highly dense sintered cubic boron nitride sintered compact having high hardness, can be obtained.

11 Claims, 6 Drawing Sheets

METHOD FOR PRODUCING SINTERED CUBIC BORON NITRIDE COMPACT

BACKGROUND OF THE INVENTION

1. Field of the Invention

The present invention relates to a method for producing a sintered cubic boron nitride compact having high hardness and uniformity. In particular, it relates to a production method allowing to obtain a sintered cubic boron nitride compact having high uniformity, high-density, and hardness, without using a binder, under a condition which is relatively low pressure and temperature (5 GPa or higher and 1400° C. or higher) comparing to conditions used in the past.

Priority is claimed on Japanese Patent Application No. 2010-026539, filed Feb. 9, 2010, the content of which is incorporated herein by reference.

2. Description of Related Art

Conventionally, for cutting of an iron-based workpiece, such as high hardness steel, a material with low compatibility to the iron-based workpiece, such as a sintered cubic boron nitride (hereinafter, referred to as cBN) compact, has been used.

In general, the sintered cBN compact is produced by mixing cBN starting powders with a binder, such as metal and ceramic, and by treating the mixture with ultra-high pressure and high temperature. However, because the sintered compact contains the binder, hardness and thermal conductivity of the sintered cBN compact deteriorate, and thereby failing to perform as good as it supposes to.

To solve the problem caused by using a binder, a method for producing a sintered cBN compact having high purity has been proposed. In this method, the cBN starting powders are cleansed by a supercritical fluid which is free of oxygen, and the cleansed cBN starting powders are sintered under a high-pressure and high-temperature condition without a binder, as disclosed in Japanese Unexamined Patent Application, First Publication No. 2007-70148. In this method, a source material of the supercritical fluid is one or more selected from a group consisting of polyvinylidene chloride, polyvinyl chloride, and polyethylene in solid state, and the sintering pressure is 5 GPa or higher and the sintering temperature is 1400° C. or higher. According to this producing method, it is reported that a highly pure sintered cBN compact that has high hardness and heat resistance can be obtained.

As an alternative technology not using a binder, a method for producing a sintered cBN compact has been proposed, where the cBN starting powders are sintered without a binder in an ultra-high pressure and high temperature condition in which cBN is thermodynamically stable. In this method, the sintering pressure is 7 GPa or higher, and the sintering temperature is 2100° C. or higher, as disclosed in Japanese Unexamined Patent Application, First Publication No. H3-159964. However, this method is not practical for higher production volume. Particularly, having a production apparatus for the sintered cBN compact of this method in larger scale, would cause not only higher cost but also higher difficulty to operate the apparatus. Thus, this method is not practical.

SUMMARY OF THE INVENTION

The cBN has hardness comparable to the diamond, and is thermally and chemically stable. Furthermore, the cBN shows an excellent abrasion resistance. The cBN has been used as a material of a cutting tool used against an iron-based workpiece, such as high-speed steel, dies steel and cast iron.

Recently, a heterogeneous composite material has been used to reduce the weight of automotive components. However, when the sintered cBN compact is used as a cutting tool material for the heterogeneous composite material (for example, a composite material composed of ductile cast iron and an aluminum alloy), chipping, fracturing, or the like occurs, mainly due to a high load on the tool and non-uniformity of the sintered cBN compact. In the end, the chipping, fracturing, or the like leads to breaking of the cutting tool, and shorten its lifetime.

An object of the present invention is to provide a new producing method allowing to obtain a sintered cBN compact with high hardness, high uniformity, and high density, at low cost easily.

The inventors of the present invention had made a thorough investigation in regard to the treatment conditions of starting powders or the like in production of a sintered cBN compact. As a result, they found knowledge described below.

In the method for producing the sintered compact disclosed in Japanese Unexamined Patent Application, First Publication No. 2007-70148, cBN powders having a particle size of 0.5 to 2 μm are used as a starting material. As a supercritical fluid source, a composition that remains in a solid state at ordinary temperatures and pressures and is free of oxygen is used. More specifically, the composition is one or more selected from a group consisting of polyvinylidene chloride, polyvinyl chloride and a polyethylene. The cBN powder is cleansed using the supercritical fluid source brought into the supercritical fluid state, and is sintered at a condition where the pressure is 5 or higher and the temperature is 1400 or higher without adding a binder. As a result, the sintered cBN compact of Japanese Unexamined Patent Application, First Publication No. 2007-70148 is obtained.

By observing the structure on a cross section of the sintered cBN compact obtained by the method in Japanese Unexamined Patent Application, First Publication No. 2007-70148, the inventors of the present invention found that the starting powders of the sintered cBN compact were aggregated into secondary particles. Furthermore, the formation of the secondary particles prevented the supercritical fluid from uniformly dispersing into the inside of the secondary particles. Finally, the inventors found that when the starting powders with the secondary particles were sintered, abnormal grains were grown in the sintered cBN compact locally, and a non-uniform structure was formed.

In addition, the present inventors found that since deflocculation of the secondary particles in the starting powders was not sufficient, after the cleansing with the supercritical fluid containing chlorine (polyvinylidene chloride, polyvinyl chloride or the like), the chlorine remained in the sintered cBN compact non-uniformly. This uneven deposition of chlorine caused non-uniformity of the structure and characteristics of the sintered cBN compact.

Thus, the inventors of the present invention carried out further investigation to deflocculate the secondary particles in the starting powders of the sintered cBN compact.

As a result, the inventors found that the secondary particles in the starting powders of the sintered cBN compact could be deflocculated sufficiently by having a pretreatment, in which the cBN starting powders were dispersed in a solution of a deflocculant and then the solution of the deflocculant was removed afterward. The pretreatment was carried out before the cleansing and sintering of the cBN starting powders. After the pretreatment, the cBN starting powders were molded to form a green compact. By following the procedure described above, the supercritical fluid could penetrate uniformly into gaps between individual cBN powders, cleansing the surface of the powder particle. Consequently, when the green compact was sintered, a sintered cBN compact whose structural characteristics was excellent in terms of uniformity and high-density, was obtained. Also the sintered cBN compact had high hardness.

Since the structure and characteristics of the cBN sintered body produced by this method are uniform and highly dense, and the sintered cBN compact has high hardness, the sintered cBN compact is suitable for a material of a machining tool with anti-chipping and anti-abrasion properties, and a longer lifetime.

One aspect of the present invention is a method for producing a sintered cBN compact, the method includes, a step of deflocculating, in which secondary particles in boron nitride starting powders are deflocculated by dispersing the boron nitride starting powders in a solution of a deflocculant to be a dispersion liquid, a step of removing, in which the solution of deflocculant is removed from the dispersion liquid after the step of deflocculating, a step of molding, in which the boron nitride starting powders are molded to form a green compact after the step of removing, and a step of sintering, in which the green compact is pressurized at 5 GPa or higher and heated at 1400° C. or higher in the presence of a supercritical fluid source, the supercritical fluid source is put into a supercritical state, and the green compact is sintered, after the step of molding, wherein a content ratio of the deflocculant in the solution of the deflocculant ranges from 0.1 to 5 wt % of a sum of the deflocculant and the cubic boron nitride starting powders as a weight.

The deflocculant may be one or more selected from a group consisting of an alkali metal phosphate salt, an alkali metal carbonate salt, an alkali metal silicate salt, an alkali metal aluminate salt, and an alkali metal hydroxide.

The deflocculant may be one or more selected from a group consisting of sodium phosphate, sodium polyphosphate, sodium metaphosphate, sodium carbonate, sodium silicate, sodium alminate and sodium hydroxide.

The deflocculant may be sodium metaphosphate.

The supercritical fluid source may be one or more selected from a group consisting of polyvinylidene chloride, polyvinyl chloride, polyethylene, polypropylene, polystyrene, a polyester and an ABS resin.

The producing method of the present invention may further comprise a step of eliminating by vacuuming and heating, in which the deflocculant remaining in the green compact is eliminated by heating the green compact under vacuum, after the step of molding and before the step of sintering.

The green compact, a metal foil, and the supercritical fluid source may be stacked, and the metal foil may be made of one or more selected from a group consisting of Zr, Nb, Mo, and Ta.

A mass ratio of the supercritical fluid source to the cubic boron nitride starting powder may range from 0.02 to 0.2 wt %.

As described above, in producing a sintered cBN compact, an uniform and highly dense sintered cBN compact with high hardness, can be obtained by deflocculating the secondary particles in the cBN starting powders first, then removing the solution of the deflocculant, then cleansing the cBN starting powders with a supercritical fluid, and then sintering the cleansed cBN starting powders in the absence of a binder. In the deflocculating, the cBN starting powders are pretreated with a solution of a deflocculant. The sintering is performed in a condition where pressure is 5 GPa or higher and temperature is 1400° C. or higher. Cubic boron nitride is thermodynamically stable under the condition. The sintered cBN compact produced by the method described above retains a fine microstructure, being free of an abnormal grain growth, and having powder particles bonded each other strongly.

In addition, in producing a sintered cBN compact, an uniform and highly dense sintered cBN compact with high hardness, can be obtained by deflocculating the secondary particles in the cBN starting powders first with a dispersing solution of sodium metaphosphate, then removing sodium metaphosphate by vacuuming with heat, then cleansing the cBN starting powders with a supercritical fluid, and then sintering the cleansed cBN starting powders in the absence of a binder. The sintering is performed in a condition where pressure is 5 GPa or higher and temperature is 1400° C. or higher. Cubic boron nitride is thermodynamically stable under the condition. The sintered cBN compact produced by the method described above retains a fine microstructure, being free of an abnormal grain growth, and having powder particles bonded each other strongly.

When the sintered cBN compact obtained by the method described above, is used as a material of a cutting tool used against a heterogeneous composite material, such as one consisted of ductile cast iron and an aluminum alloy, accuracy of the machined surface of the workpiece is improved, and at the same time, excellent abrasion resistance is maintained for long period of time without chipping, fracturing, and breaking. Thereby, a cutting characteristic and durability of the tool can be improved.

DETAILED DESCRIPTION OF THE INVENTION

Figure 1:
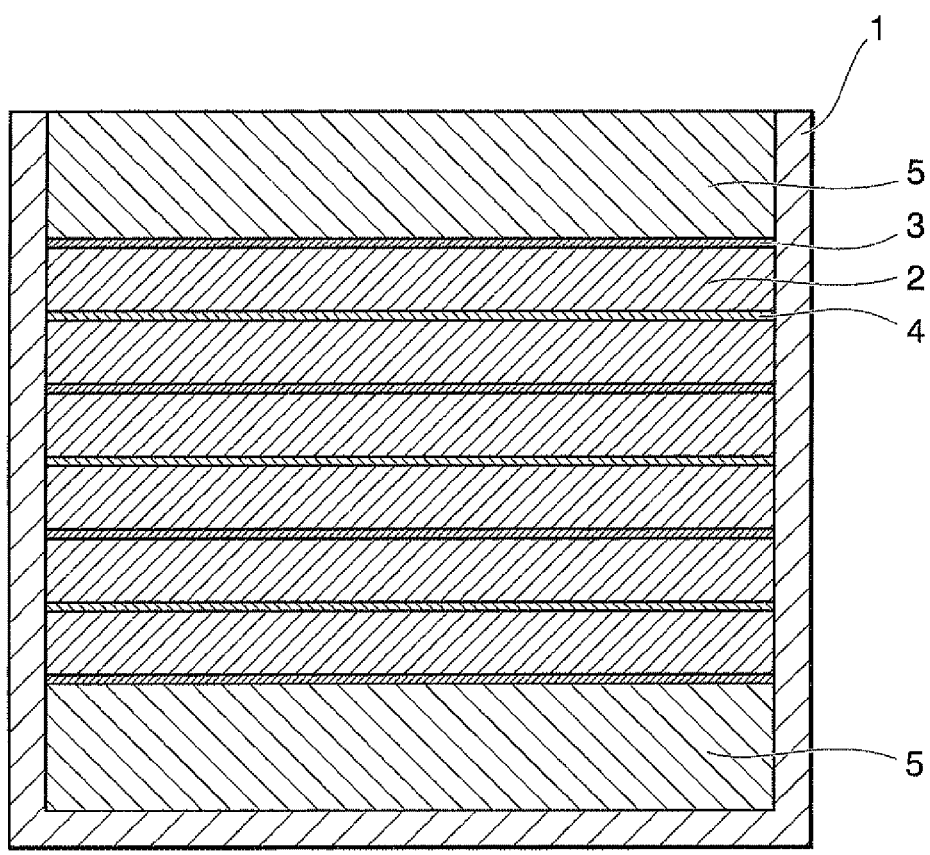
FIG. 1 is a schematic cross-sectional view of a capsule for molding the pretreated cBN starting powders to form a green compact, in the method for producing the sintered cBN compact according to the present invention.

Hereinafter, an embodiment of the present invention will be described pretreatment of cBN starting powder:

In this embodiment, pretreatment of cBN starting powders represents steps from a deflocculation treatment of the cBN starting powders to a molding treatment of the cBN starting powders to form a green compact.

In this embodiment, fine starting powders are used as cBN starting powders. The larger the particle size of the powders, the harder to sinter. Thus, it is preferable to use cBN starting powders with a diameter of 2 μm or less. It is more preferable to use ones with diameters ranges from 0.5 to 1.5 μam. It is further more preferable to use ones with diameter ranges from 0.5 to 1.3 μm.

The fine cBN starting powders described-above are dispersed in a solution of a deflocculant to be a dispersion liquid, deflocculating the secondary particles in the cBN starting powders.

Among the deflocculants that can be used in this embodiment, there are an alkali metal phosphate salt, an alkali metal carbonate salt, an alkali metal silicate salt, an alkali metal aluminate salt, an alkali metal hydroxide, and the like. Among the deflocculants belonging to alkali metal phosphate salts, there are sodium phosphate, sodium polyphosphate, sodium metaphosphate, and the like. Among the deflocculants belonging to alkali metal carbonate salts, there are sodium carbonate and the like. Among the deflocculants belonging to alkali metal silicate salts, there are sodium silicate and the like. Among the deflocculants belonging to alkali metal aluminate salts, there are sodium aluminate and the like. Among the deflocculants belonging to alkali metal hydroxides, there are sodium hydroxide and the like.

As a solvent of a solution of a deflocculant, the hydrophilic water, a hydrophobic organic solvent, alcohols, and the like can be used.

The content of sodium metaphosphate is preferably 0.1 to 5 wt % as a weight ratio with respect to the sum of sodium metaphosphate and the cBN starting powder. When the content of sodium metaphosphate is less than 0.1 wt %, the cBN starting powders are not dispersed effectively. As a result, secondary particles cannot be deflocculated sufficiently. On the other hand, when the content of sodium metaphosphate exceeds 5 wt %, even after a subsequent vacuuming under heat, sodium metaphosphate cannot be removed sufficiently. As a result, larger amount of phosphorus and sodium, which are components of sodium metaphosphate, is left in the sintered cBN compact. Having increased amount of phosphorus and sodium in the sintered cBN compact has an inhibitory effect on sintering process, leading to formation of a sintered compact with un-uniformity of its structure and characteristics. Therefore, the content of sodium metaphosphate is set to from 0.1 to 5 wt % as a weight ratio relative to the sum of sodium metaphosphate and the cBN starting powders.

After deflocculation of secondary particles in the starting powders, the solution of the deflocculant is removed from the starting powders through a conventional method such as filtering, a centrifugal separation, and evaporation by heating.

Then, a mold is filled with the above-mentioned cBN starting powders to form a green compact, which is free of the secondary particle.

In a case where a solution of sodium metaphosphate is used as a solution of a deflocculant, a specified amount of cBN starting powders in fine particles, is added to the solution of sodium metaphosphate to prepare a dispersion liquid. By stirring the dispersion liquid under heat, the secondary particles in the cBN starting powders are deflocculated. After deflocculation, the dispersion liquid is heated, removing moisture, till the cBN starting powders are dried.

Then, a mold is filled with the resulting dried powders to form a green compact. Then the green compact is placed in vacuum under heat, for example at 1000° C. for about 30 minutes, to remove sodium metaphosphate remaining in the green compact.

Preferable heating temperature and the lapse of time in the step of vacuuming and heating range, from 800 to 1300° C., and from 20 to 60 minutes, respectively. While the vacuum pressure should be kept below $1 \times 10^{-2}$ Pa.

It is preferable to reduce the amount of remaining sodium metaphosphate in the green compact to 5 wt % or less with respect to the weight of the green compact in the vacuuming and heating process.

Through the pretreatments described above, it is possible to obtain a green compact, being free of the secondary particle and, having extremely small amount of the deflocculant (sodium metaphosphate).

Cleansing:

The green compact, which is obtained through the above described-pretreatment, is placed in a capsule with a supercritical fluid source. The supercritical fluid source can be one or more selected from a group consisted of polyvinylidene chloride, polyvinyl chloride, polyethylene, polypropylene, polystyrene, a polyester and an ABS resin. The capsule holding the green compact and the supercritical fluid source inside, is pressurized and heated to reach a condition that cubic boron nitride is thermodynamically stable. The pressure is 5 GPa or higher, and the temperature is 1400° C. or higher. In more preferable condition, the pressure ranges from 5 to 7 GPa and the temperature ranges from 1400 to 1900° C. In even more preferable condition, the pressure ranges from 5 GPa to 6 GPa, and the temperature ranges from 1400 to 1900° C. Since the green compact that is pretreated as described above, is free of the secondary particle, the supercritical fluid penetrates uniformly into a gap between the cBN fine particles, activating the surface of the cBN particles sufficiently. As a result, an uniform and highly dense sintered cBN compact, in which fine particles of the cBN are strongly bonded each other, is formed in the absence of a binder, and the sintered cBN compact becomes extremely hard physically.

Preferably, a material for the capsule holding the green compact and the supercritical fluid source is a metal with high melting point. More preferably, it can be one or more selected from a group consisted of Zr, Nb, Mo, and Ta.

In terms of the supercritical fluid source placed in the capsule, preferable amount of the supercritical fluid source, which is one or more selected from a group consisted of polyvinylidene chloride, polyvinyl chloride, polyethylene, polypropylene, polystyrene, a polyester and an ABS resin, ranges from 0.02 to 0.2 wt % relative to the weight of cBN starting powders. If the amount of the supercritical fluid source is less than 0.02 wt % of the cBN starting powders, the cleansing effect is limited. If the amount of the supercritical fluid source is more than 0.2 wt %, it results in growth of abnormal grain and leaving significant amount of the supercritical fluid in the sintered compact, leading to cracking or other defects.

Sintering Condition:

In the conventional method for producing a sintered cBN compact, the sintering is performed under an ultra high pressure and high temperature condition where the pressure applied is 6 GPa or higher and temperature is 1700° C. or higher. In contrast to the conventional method, according to the present invention, the sintering of the cBN compact can be performed without a binder under a relatively mild condition of 5 GPa or higher and 1400° C. or higher (preferably, the pressure ranges from 5 to 7 GPa, the temperature ranges from 1400 to 1900° C., and the lapse of the sintering time ranges from 5 to 30 minutes), which is a relatively low temperature and low pressure condition compared to the conventional method. Even more preferably, in the present invention, sintering can be performed in a milder condition, in which the pressure applied ranges from 5 to 6 GPa, the temperature ranges from 1400 to 1900° C., and the lapse of the sintering time ranges from 5 to 30 minutes. Because of the sintering under the mild conditions, growth of an abnormal grain can be suppressed. Consequently, the sintered cBN compact obtains an uniform and highly dense structure made of fine particles, and becomes extremely hard physically.

When the pressure applied is lower than 5 GPa, the cBN is inversely transformed into a hexagonal boron nitride (hBN) during sintering, making difficult for the green compact to be sintered. When the temperature is lower than 1400° C., direct bonding of the cBN fine particles does not occur, making difficult for the green compact to be sintered. Thus, it is necessary to keep the pressure to 5 GPa or higher and the temperature to 1400° C. or higher (preferably, the pressure ranges from 5 to 7 GPa, the temperature ranges from 1400 to 1900° C., and the lapse of sintering time ranges from 5 to 30 minutes). Even more preferably, in the present invention, sintering can be performed in a milder condition, in which the pressure applied ranges from 5 to 6 GPa, the temperature ranges from 1400 to 1900° C., and the lapse of the sintering time ranges from 5 to 30 minutes.

FIG. 1 shows an example of the capsule used in the present invention, in which the pretreated compacts are place in the capsule.

Inside of the Zr capsule 1, the green compact 2 consisted from pretreated cBN powders with a diameter of 2 μm or less, the Zr foil 3 that is metal foil (divider), and polyvinylidene chloride 4 that is a supercritical fluid source, are stacked alternatively. On top and bottom of the stacking, graphite disks 5 are placed.

As a more detailed explanation, on top of the bottom graphite disk 5, following components are stacked in order toward upward: the Zr foil 3, the green compact 2, polyvinylidene chloride 4, the green compact 2, and the Zr foil 3. In the example shown in FIG. 1, three units of the above-described stacking set are included in the capsule. On the Zr foil 3 located on the top of the stack, a top graphite disk 5 is placed.

In this embodiment, the Zr capsule is used as a sample container, and the graphite disk is placed at the lower side of the capsule (the bottom graphite disk). Three sheets of the Zr foil are placed on the bottom graphite disk. The green compact made of the pretreated cBN powders with a particle size of 2 μm or less, is placed on the Zr foils. Then, the polyvinylidene chloride, which is a supercritical fluid source, is placed on the green compact. Then, another green compact made of the pretreated cBN powders with a particle size of 2 μm or less, is place on the polyvinylidene chloride. Then, three sheets of the Zr foil in a disk shape, are placed on the green compact. In addition, polyvinylidene chloride is placed between the green compacts to be sandwiched, and the top of the green compact is covered by the Zr foil.

As a supercritical fluid source, not only polyvinylidene chloride but also one or more selected from a group consisted of polyvinylidene chloride, polyvinyl chloride, polyethylene, polypropylene, polystyrene, the polyester, and the ABS resin may be used.

As a material for the metal foil (divider), not only Zr, but also one or more selected from a group consisted of Zr, Nb, Mo, and Ta may be used.

Hereinafter, a method for producing a highly uniform and highly dense sintered cBN compact having high hardness will be described in detail on the basis of examples.

EXAMPLES

Pretreatment:
Predetermined amounts of sodium metaphosphate, sodium pyrophosphate, and sodium silicate, as shown in Table 1, Table 2, and Table 3, respectively, as a deflocculant were added to 200 ml of purified water, and the resultant solution was heated while being stirred using a hot stirrer at a rotation number of 150 rpm and a plate temperate of 100° C. for one hour.

Then, predetermined amounts of cBN starting powders having a particle size of 2 μm or less, were added to the aqueous solution of sodium metaphosphate, sodium pyrophosphate, and sodium silicate, as shown in Table 1, Table 2, and Table 3, respectively, to prepare the dispersion liquids having predetermined content ratios of sodium metaphosphate, sodium pyrophosphate, and sodium silicate [weight of a deflocculant (g)/(weight of the cBN starting powders (g)+ weight of a deflocculant (g))]. The dispersion liquids, which are solutions of deflocculants containing the cBN starting powders, were stirred at a rotation number of 150 rpm, under heat at the plate temperature of 200° C., for one hour.

Then, the dispersion liquids, which are solutions of sodium metaphosphate, sodium pyrophosphate, and sodium silicate containing the cBN starting powders, was stirred at a rotation number of 150 rpm, under heat at the plate temperature of 350° C. to remove moisture. Then, the cBN staring powders were placed in a drier for about 10 to 12 hours to dry the powders.

Then, molds having a dimension of φ12.5 were filled with 0.5 g of the powders obtained though the drying process described above. The powders in the mold were pressed at a molding pressure of 3 ton/cm² to form green compacts. The green compacts were heated under vacuum in conditions, shown in Table 1, Table 2, and Table 3, to prepare the green compacts in which residual deflocculants were eliminated.

Sintering:
The green compacts (0.2 g of each) obtained as described above were placed in Zr capsules as shown in FIG. 1 with the predetermined amounts of supercritical fluid sources (polyvinylidene chloride, polyvinyl chloride, polyethylene, polypropylene, polystyrene) as shown in Table 4. With a belt type ultra-high pressure generating device, the Zr capsules were placed in conditions shown in Table 5 to sinter the green compacts. The conditions shown in Table 5 (pressure and temperature) are the conditions that the cubic boron nitride is thermodynamically stable. By sintering the green compacts in the conditions, the sintered cBN compacts 1 to 16 of the present invention (hereinafter, referred as the sintered compacts 1 to 16 of the present invention) were produced.

Occurrence of the inverse transformation of cBN (to hBN) in the sintered compacts 1 to 16 of the present invention, was monitored by performing the XRD measurement using AXSMXP18VAHF (trade name, manufactured by Bruker AXS K. K.).

In addition, Vickers hardness Hv of the sintered compacts 1 to 16 of the present invention was measured with 1 kg force applied, after grinding their surfaces and polishing using a diamond paste as an abrasive.

Furthermore, distribution of residual chlorine of the sintered compacts 1 to 16 of the present invention, was analyzed by EPMA area analysis. The residual chlorine is originated mainly from the supercritical fluid sources containing chlorine, such as polyvinylidene chloride and polyvinyl chloride.

The occurrence of the inverse transformation of cBN, Vickers hardness, and the distribution of residual chlorine of the sintered compacts 1 to 16 of the present invention, are shown in Table 5.

Figure 2:
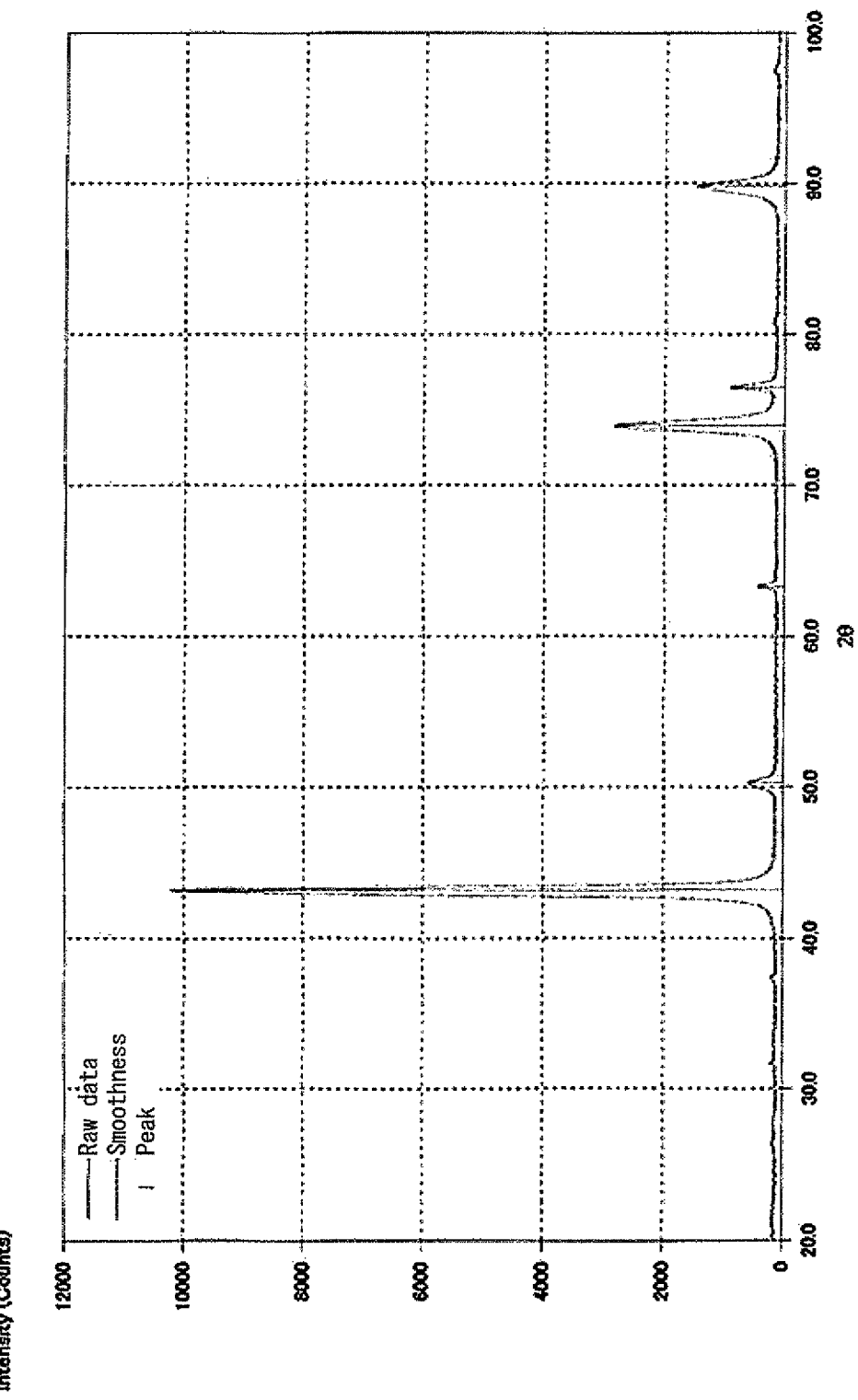
FIG. 2 is an X-ray diffraction chart of the sintered compact 1 of the present invention.
Figure 3A:
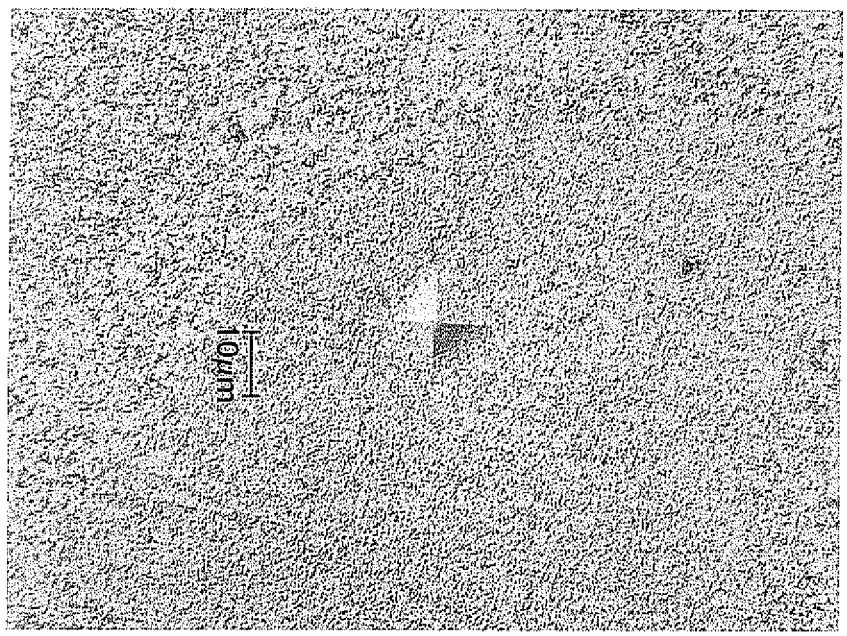
FIG. 3A is an optical microscopic image of an indentation in a measurement of Vickers hardness Hv of the sintered compact 1 of the present invention (magnification: ×750).
Figure 3B:
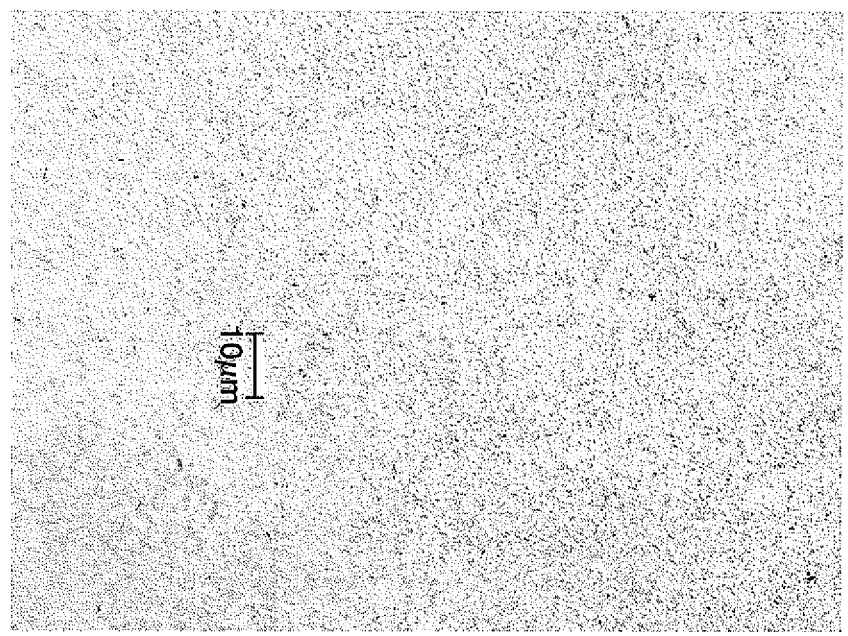
FIG. 3B is an optical microscopic image of an uniform and highly dense microstructure of the sintered compact 1 of the present invention.
Figure 4:
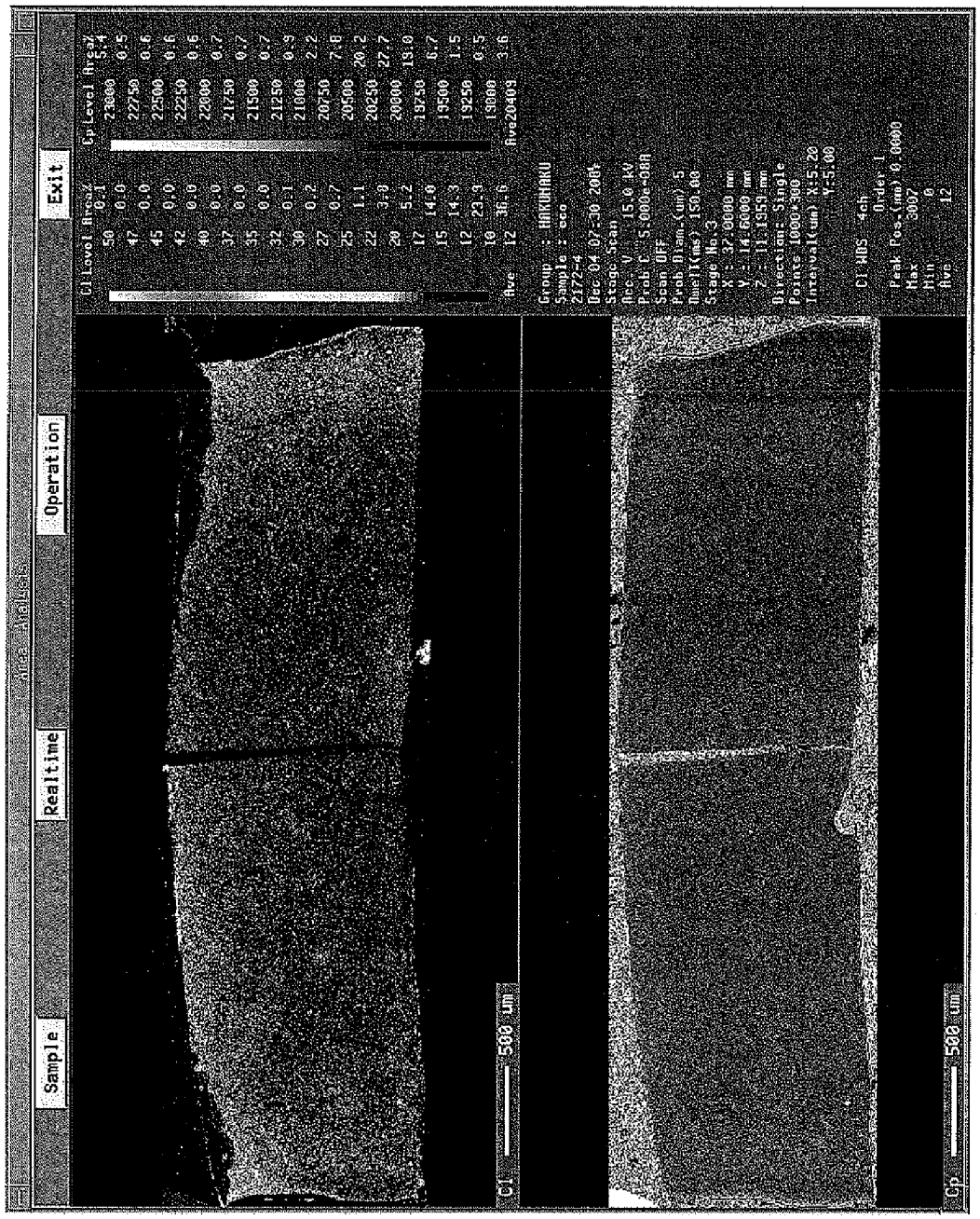
FIG. 4 is a photographic image of an EPMA area analysis, visualizing residual chlorine in the sintered compact 1 of the present invention.

In FIG. 2, as an example, the X-ray diffraction chart of the sintered compact 1 of the present invention, is shown. The chart was obtained with the AXSMXP18VAHF (trade name, manufactured by Bruker AXS K. K.). In FIG. 3A, an indentation on the sintered compact 1 of the present invention, in the measurement of the Vickers hardness Hv, is shown. In FIG. 4, a photographic image of the EPMA area analysis analyzing the distribution of residual chlorine in the sintered compact 1 of the present invention, is shown.

For the purpose of comparison, sintered compacts 1 to 10 of the comparative example were produced under the conditions diverted from those of the present invention as shown in Tables 1 to 5.

The conditions for producing the sintered compacts 1 to 10 of the comparative example are shown in Tables 6 and 7.

As for the sintered compacts of the present invention, the occurrence of the inverse transformation of cBN was monitored, Vickers hardness was measured, and the distribution of residual chlorine was analyzed, for the sintered compacts 1 to 10 of the comparative example (shown in Table 8).

Figure 5A:
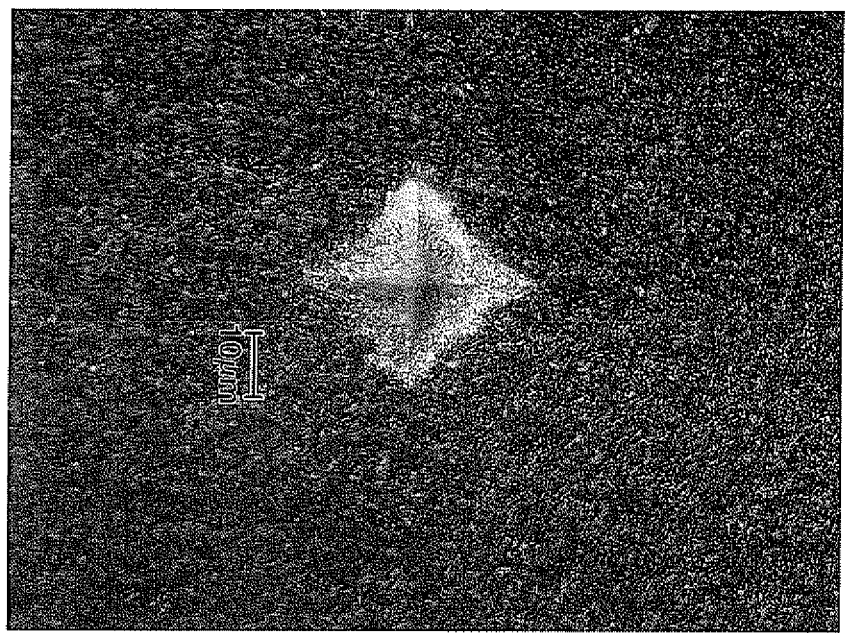
FIG. 5A is an optical microscopic image of an indentation in a measurement of Vickers hardness Hv of the sintered compact 3 of the comparative example (magnification: ×750).
Figure 5B:
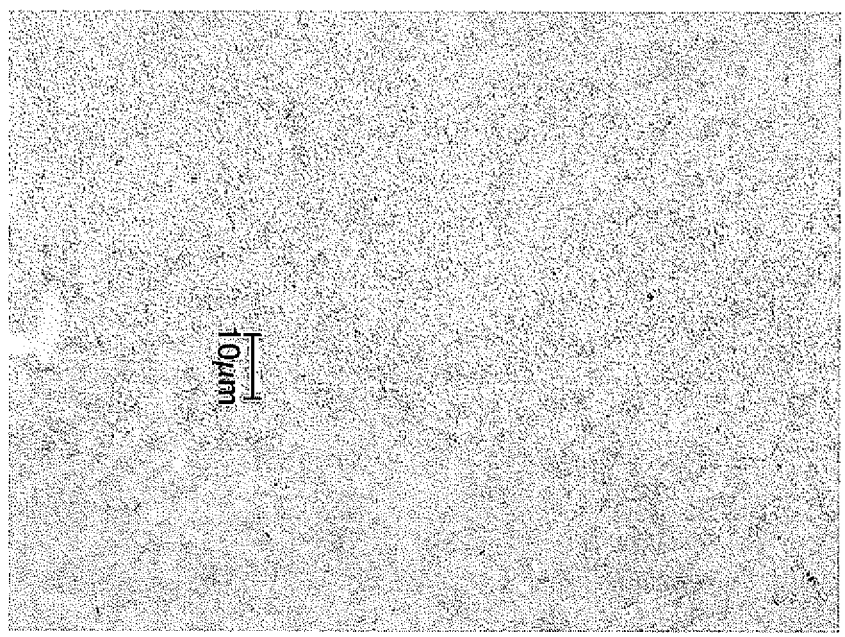
FIG. 5B is an optical microscopic image of a non-uniform microstructure of the sintered compact 3 of the comparative example, on which course and fine parts are mixed.
Figure 6:
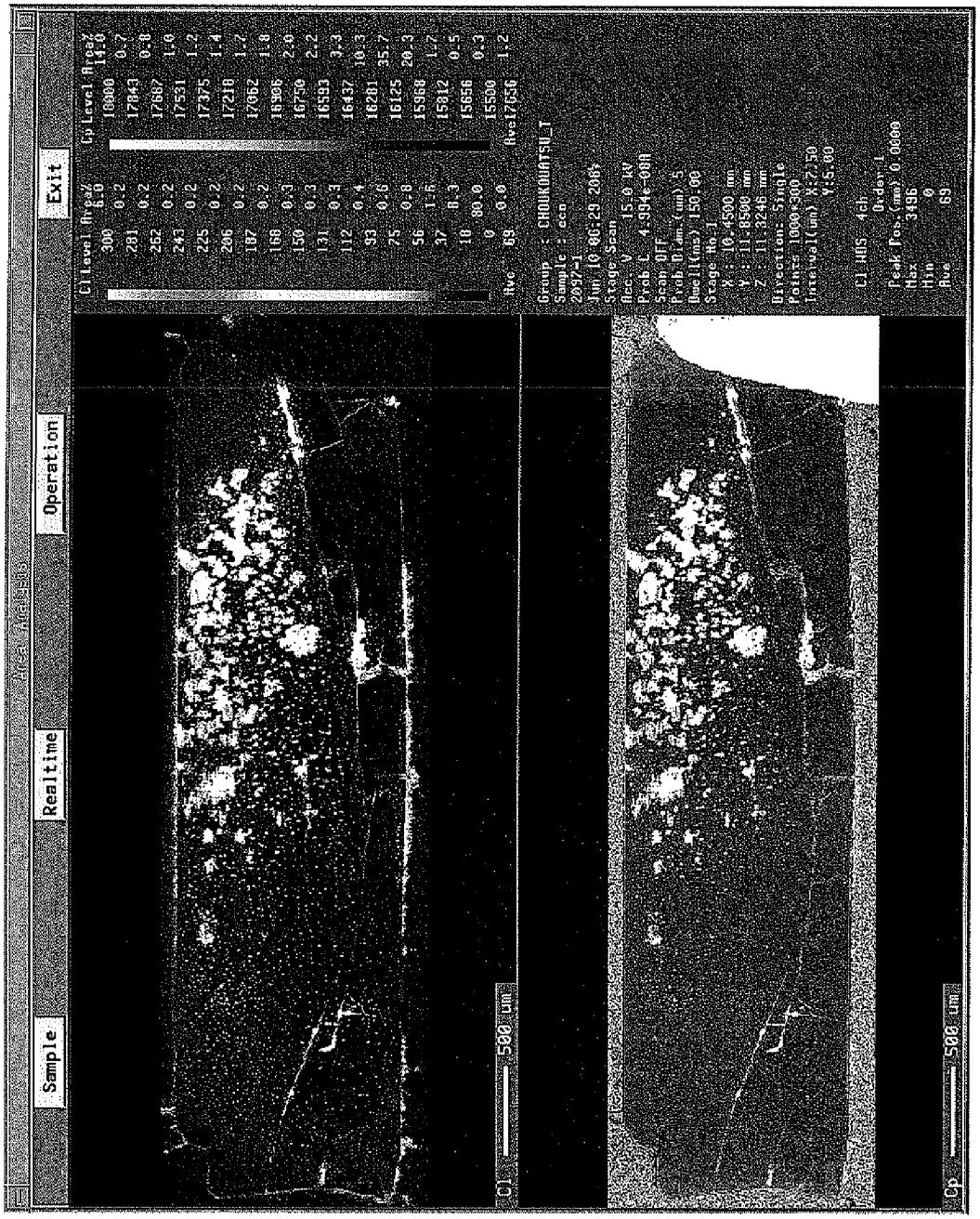
FIG. 6 is a photographic image of an EPMA area analysis, visualizing residual chlorine in the sintered compact 7 of the comparative example.

In FIG. 5A, an indentation on the sintered compact 7 of the comparative example, in the measurement of the Vickers hardness Hv, is shown. In FIG. 6, a photographic image of the EPMA area analysis analyzing the distribution of residual chlorine in the sintered compact 7 of the comparative example, is shown.

TABLE 4

| Symbol of supercritical fluid source | Supercritical fluid source | |
|---|---|---|
| | Sort of supercritical fluid source | Amount added (wt %) |
| A | Polyvinylidene chloride | 0.02 |
| B | Polyvinylidene chloride | 0.2 |
| C | Polyvinylidene chloride (50 wt %) + polyvinyl chloride (50 wt %) | 0.1 |
| D | Polyvinylidene chloride (50 wt %) + polyethylene (50 wt %) | 0.08 |
| E | Polyvinylidene chloride (50 wt %) + polypropylene (50 wt %) | 0.1 |
| F | Polyvinylidene chloride (50 wt %) + polystyrene (50 wt %) | 0.08 |

(Note)
Additive amount (wt %) = amount of supercritical fluid source/amount of cBN starting powder × 100

TABLE 1

| Pretreatment symbol | Sodium metaphosphate solution | | | Vacuum heating condition of a green compact | |
|---|---|---|---|---|---|
| | Amount of sodium metaphosphate (g) | Amount of cBN (g) | Content ratio of sodium metaphosphate (wt %) | Heating temperature (° C.) | Heating time (min) |
| A | 0.05 | 10 | 0.5 | 800 | 60 |
| B | 0.01 | 10 | 0.1 | 600 | 30 |
| C | 0.1 | 10 | 1 | 1000 | 30 |
| D | 0.3 | 10 | 3 | 1000 | 30 |
| E | 0.5 | 10 | 5 | 1300 | 20 |

TABLE 2

| Pretreatment symbol | Sodium pyrophosphate solution | | | Vacuum heating condition of a green compact | |
|---|---|---|---|---|---|
| | Amount of sodium pyrophosphate (g) | Amount of cBN (g) | Content ratio of sodium pyrophosphate (wt %) | Heating temperature (° C.) | Heating time (min) |
| F | 0.05 | 10 | 0.5 | 800 | 60 |
| G | 0.01 | 10 | 0.1 | 800 | 30 |

TABLE 3

| Pretreatment symbol | Sodium silicate solution | | | Vacuum heating condition of a green compact | |
|---|---|---|---|---|---|
| | Amount of sodium silicate (g) | Amount of cBN (g) | Content ratio of sodium silicate (wt %) | Heating temperature (° C.) | Heating time (min) |
| H | 0.1 | 10 | 1 | 800 | 60 |
| I | 0.3 | 10 | 3 | 1000 | 60 |

TABLE 5

| Classification | | Pretreatment symbol | Symbol of supercritical fluid source | Sintering condition Pressure (GPa) | Sintering condition Temperature (° C.) | Whether inverse transformation of cBN is present or not | Vickers hardness (Hv) | Distribution state of residual chlorine in sintered cBN compact |
|---|---|---|---|---|---|---|---|---|
| Sintered compacts of the present invention | 1 | C | B | 5.5 | 1600 | None | 4808 | Uniform distribution |
| | 2 | A | B | 5 | 1600 | None | 4628 | Uniform distribution |
| | 3 | D | C | 6 | 1400 | None | 3942 | Uniform distribution |
| | 4 | E | A | 5.5 | 1500 | None | 4132 | Uniform distribution |
| | 5 | A | B | 6.5 | 1400 | None | 3805 | Uniform distribution |
| | 6 | B | A | 6.5 | 1700 | None | 4263 | Uniform distribution |
| | 7 | C | C | 5.5 | 1600 | None | 4180 | Uniform distribution |
| | 8 | D | D | 5.5 | 1500 | None | 4336 | Uniform distribution |
| | 9 | E | D | 6 | 1400 | None | 3785 | Uniform distribution |
| | 10 | C | D | 6.5 | 1700 | None | 4125 | Uniform distribution |
| | 11 | F | E | 5.5 | 1500 | None | 4126 | Uniform distribution |
| | 12 | G | E | 5.5 | 1500 | None | 4336 | Uniform distribution |
| | 13 | H | E | 6 | 1600 | None | 4157 | Uniform distribution |
| | 14 | I | E | 5.5 | 1500 | None | 4236 | Uniform distribution |
| | 15 | F | F | 6.5 | 1700 | None | 4534 | Uniform distribution |
| | 16 | H | F | 6.5 | 1700 | None | 4411 | Uniform distribution |

TABLE 6

| Pretreatment symbol | Sodium metaphosphate aqueous solution Amount of Sodium metaphosphate (g) | Sodium metaphosphate aqueous solution Amount of cBN (g) | Sodium metaphosphate aqueous solution Content ratio of sodium metaphosphate (wt %) | Vacuum heating condition Heating temperature (° C.) | Vacuum heating condition Heating time (min) |
|---|---|---|---|---|---|
| a | — | — | — | — | — |
| b | 0.001 | 10 | 0.01 | 700 | 30 |
| c | 0.005 | 10 | 0.05 | 1000 | 10 |
| d | 0.6 | 10 | 6 | 600 | 120 |
| e | 1 | 10 | 10 | 1400 | 30 |

TABLE 7

| Symbol of supercritical fluid source | Supercritical fluid source Sort of supercritical fluid source | Supercritical fluid source Amount added (wt %) |
|---|---|---|
| a | Polyvinylidene chloride | 0.01 |
| b | Polyvinylidene chloride | 0.5 |
| c | Polyvinylidene chloride (50 wt %) + polyvinyl chloride (50 wt %) | 0.8 |
| d | Polyvinylidene chloride (50 wt %) + polyethylene (50 wt %) | 1 |

(Note)
Additive amount (wt %) = amount of supercritical fluid source/amount of cBN starting powder × 100

TABLE 8

| Classification | | Pretreatment symbol | Symbol of supercritical fluid source | Sintering condition Pressure (GPa) | Sintering condition Temperature (° C.) | Whether inverse transformation of cBN is present or not | Vickers hardness (Hv) | Distribution state of residual chlorine in sintered cBN compact |
|---|---|---|---|---|---|---|---|---|
| Sintered compact of the comparative example | 1 | a | a | 5.5 | 1600 | None | 2417 | Non-uniform, aggregation observed |
| | 2 | c | b | 6 | 1700 | None | 2559 | Non-uniform, aggregation observed |
| | 3 | e | c | 5.5 | 1500 | None | Unmeasurable | Non-uniform, aggregation observed |
| | 4 | d | d | 5 | 1600 | None | 2138 | Non-uniform, aggregation observed |
| | 5 | b | c | 6 | 1400 | None | 1892 | Non-uniform, aggregation observed |
| | 6 | c | b | 5.5 | 1300 | None | Unmeasurable | Non-uniform, aggregation observed |
| | 7 | e | d | 4 | 1600 | None | Unmeasurable | Non-uniform, aggregation observed |

TABLE 8-continued

| Classification | Pretreatment symbol | Symbol of supercritical fluid source | Sintering condition Pressure (GPa) | Sintering condition Temperature (° C.) | Whether inverse transformation of cBN is present or not | Vickers hardness (Hv) | Distribution state of residual chlorine in sintered cBN compact |
|---|---|---|---|---|---|---|---|
| 8 | a | d | 3.7 | 1700 | None | Unmeasurable | Non-uniform, aggregation observed |
| 9 | d | a | 6 | 1200 | None | Unmeasurable | Non-uniform, aggregation observed |
| 10 | b | b | 6.5 | 1300 | None | 1912 | Non-uniform, aggregation observed |

The peak intensity corresponding to the cubic boron nitride was observed in the X-ray diffraction charts of the sintered compacts 1 to 16 of the present invention and the sintered compacts 1 to 10 of the comparative example, as represented in FIG. 2. Also, the peak intensity corresponding to the hexagonal boron nitride was not observed in the X-ray diffraction charts. These results indicated that there was no occurrence of the inverse transformation of cBN in both sintered compacts of the present invention and those of the comparative example, and they were sintered cubic boron compacts.

By comparing Vickers hardness shown in Table 5 and Table 8, sizes of the indentation presented in FIGS. 3A, 3B, 5A, and 5B, it was demonstrated that the sintered compacts 1 to 16 of the present invention showed high hardness, while the sintered compacts 1 to 10 of the comparative example showed low hardness, failing to achieve having sufficient hardness. In Table 8, "unmeasurable" means that the sintered compact was too soft to form a distinctive indentation in the Vickers hardness measurement.

By comparing the distribution status of residual chlorine shown in Table 5 and Table 8, and photographic images of the area analysis shown in FIGS. 4 and 6, it was demonstrated that there was only small amount of residual supercritical fluid source remaining in the sintered compacts 1 to 16 of the present invention, and moreover, there was less aggregation of the remaining supercritical fluid source, spreading all over in the sintered compacts evenly. Therefore, uniformity of structure, component, and characteristics was maintained in the sintered compacts 1 to 16 of the present invention.

On the other hand, in the sintered compacts 1 to 10 of the comparative example, amount of residual supercritical fluid source was high, and aggregations of the residual supercritical fluid were formed at certain locations in the sintered compacts. Therefore, structure, component, and characteristics of the sintered compacts of the comparative example were non-uniform, varying by location. In addition, it was demonstrated that rough and fine structures were mixed in the sintered compacts 1 to 10 of the comparative example, being not uniform structurally.

As described above, in producing a sintered cBN compact, an uniform and highly dense sintered cBN compact with high hardness, can be obtained by deflocculating the secondary particles in the cBN starting powders first, then removing the solution of the deflocculant, then cleansing the cBN starting powders with a supercritical fluid, and then sintering the cleansed cBN starting powders in the absence of a binder. In the deflocculating, the cBN starting powders are pretreated with a solution of a deflocculant. The sintering is performed in a condition where pressure is 5 GPa or higher and temperature is 1400° C. or higher. Cubic boron nitride is thermodynamically stable under the condition. The sintered cBN compact produced by the method described above retains a fine microstructure, being free of an abnormal grain growth, and having powder particles bonded each other strongly.

The method for producing a sintered cBN compact of the present invention, is suitable for producing a sintered cBN compact used as a material for a cutting tool. Particularly, it is suitable as a material for a cutting tool used against a heterogeneous composite material consisted of ductile cast iron and an aluminum alloy. When a cutting tool made of the sintered cBN compact produced by the method of the present invention, accuracy of the machined surface of the workpiece is improved, and at the same time, excellent abrasion resistance is maintained for long period of time without chipping, fracturing, and breaking. Thereby, a cutting characteristic and durability of the tool can be improved. Thus, it is extremely beneficial in the industrial field.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for producing a sintered cubic boron nitride compact, the method comprising:
    a step of deflocculating, in which secondary particles in boron nitride starting powders are deflocculated by dispersing the boron nitride starting powders in a solution of a deflocculant to be a dispersion liquid;
    a step of removing, in which the solution of deflocculant is removed from the dispersion liquid after the step of deflocculating;
    a step of molding, in which the boron nitride starting powders, which have been deflocculated, are molded to form a green compact after the step of removing; and
    a step of sintering, in which the green compact is pressurized at 5 GPa or higher and heated at 1400° C. or higher in the presence of a supercritical fluid source, the supercritical fluid source is put into a supercritical state, and the green compact is sintered, after the step of molding,
    wherein a content ratio of the deflocculant in the dispersion liquid ranges from 0.1 to 5 wt % of a sum of the deflocculant and the cubic boron nitride starting powders as a weight.

2. A method for producing a sintered cubic boron nitride compact according to claim 1,
    wherein the deflocculant is one or more selected from a group consisting of an alkali metal phosphate salt, an alkali metal carbonate salt, an alkali metal silicate salt, an alkali metal aluminate salt, and an alkali metal hydroxide.

3. A method for producing a sintered cubic boron nitride compact according to claim 2,
wherein, the deflocculant is one or more selected from a group consisting of sodium phosphate, sodium polyphosphate, sodium metaphosphate, sodium carbonate, sodium silicate, sodium aluminate and sodium hydroxide.

4. A method for producing a sintered cubic boron nitride compact according to claim 3,
wherein the deflocculant is sodium metaphosphate.

5. A method for producing a sintered cubic boron nitride compact according to claim 1,
wherein the supercritical fluid source is one or more selected from a group consisting of polyvinylidene chloride, polyvinyl chloride, polyethylene, polypropylene, polystyrene, a polyester and an ABS resin.

6. A method for producing a sintered cubic boron nitride compact according to claim 2,
wherein the supercritical fluid source is one or more selected from a group consisting of polyvinylidene chloride, polyvinyl chloride, polyethylene, polypropylene, polystyrene, a polyester and an ABS resin.

7. A method for producing a sintered cubic boron nitride compact according to claim 3,
wherein the supercritical fluid source is one or more selected from a group consisting of polyvinylidene chloride, polyvinyl chloride, polyethylene, polypropylene, polystyrene, a polyester and an ABS resin.

8. A method for producing a sintered cubic boron nitride compact according to claim 4,
wherein the supercritical fluid source is one or more selected from a group consisted of polyvinylidene chloride, polyvinyl chloride, polyethylene, polypropylene, polystyrene, a polyester and an ABS resin.

9. A method for producing a sintered cubic boron nitride compact according to claim 1, further comprising:
a step of eliminating by vacuuming and heating, in which the deflocculant remaining in the green compact is eliminated by heating the green compact under a vacuum, after the step of molding and before the step of sintering.

10. A method for producing a sintered cubic boron nitride compact according to claim 1,
wherein the green compact, a metal foil, and the supercritical fluid source are stacked in a capsule after the step of molding and before the step of sintering, and
the metal foil is made of one or more selected from a group consisting of Zr, Nb, Mo, and Ta.

11. A method for producing a sintered cubic boron nitride compact according to claim 1,
wherein a mass ratio of the supercritical fluid source to the cubic boron nitride starting powder ranges from 0.02 to 0.2 wt %.

* * * * *